United States Patent [19]

Steiner et al.

[11] Patent Number: 4,682,508
[45] Date of Patent: Jul. 28, 1987

[54] INLET VALVE FOR PROBE APPARATUS

[75] Inventors: Urs Steiner, Sunnyvale; James Hurst, San Jose; J. Alan Schier, Menlo Park, all of Calif.

[73] Assignee: Finnigan Corporation, San Jose, Calif.

[21] Appl. No.: 840,513

[22] Filed: Mar. 6, 1986

[51] Int. Cl.⁴ .............................................. F16K 31/06
[52] U.S. Cl. ................................ 73/866.5; 73/863.85; 137/320; 137/317; 251/129.14; 414/217
[58] Field of Search ................ 137/320, 317, 315; 414/217, 221; 73/744, 866.5, 863.85, 863.86; 251/129.14

[56] References Cited

U.S. PATENT DOCUMENTS

| | | | |
|---|---|---|---|
| 960,857 | 6/1910 | Eggert | 414/221 |
| 2,645,279 | 7/1953 | Rossmann . | |
| 2,792,195 | 5/1957 | Mosbacher . | |
| 3,162,049 | 12/1964 | Blanchard . | |
| 3,498,313 | 3/1970 | Belich . | |
| 3,630,080 | 12/1971 | Taylor . | |
| 3,730,001 | 5/1973 | Goodwin . | |
| 3,906,989 | 9/1975 | Lamb . | |
| 4,096,754 | 6/1978 | Beveridge, Jr. et al. . | |
| 4,489,863 | 12/1984 | Horchos et al. . | |
| 4,534,314 | 8/1985 | Ackley | 414/217 X |
| 4,542,712 | 9/1985 | Sato et al. | 414/217 X |
| 4,558,587 | 12/1985 | Fruzzetti | 251/129.14 X |

FOREIGN PATENT DOCUMENTS 220043  3/1910  Fed. Rep. of Germany ..................... 251/129.14

Primary Examiner—Arnold Rosenthal
Attorney, Agent, or Firm—Flehr, Hohbach, Test, Albritton & Herbert

[57] ABSTRACT

A valve assembly for allowing entry of a sampling device or probe device from an ambient atmosphere to a vacuum chamber comprises an electromagnet means which controls a ball made of magnetic material. Upon entry of the device into an entry inlet of the apparatus, the ball is seated in response to activation of the electromagnet means so as to seal an aperture leading to the vacuum chamber. As the device is moved towards the vacuum chamber, the magnetic force is removed, which allows the ball to drop away from the aperture allowing entry of the device into the vacuum chamber. Upon withdrawal of the device from the vacuum chamber, the ball is actuated by the electromagnet to seal the aperture, thereby maintaining the integrity of the vacuum system.

9 Claims, 10 Drawing Figures

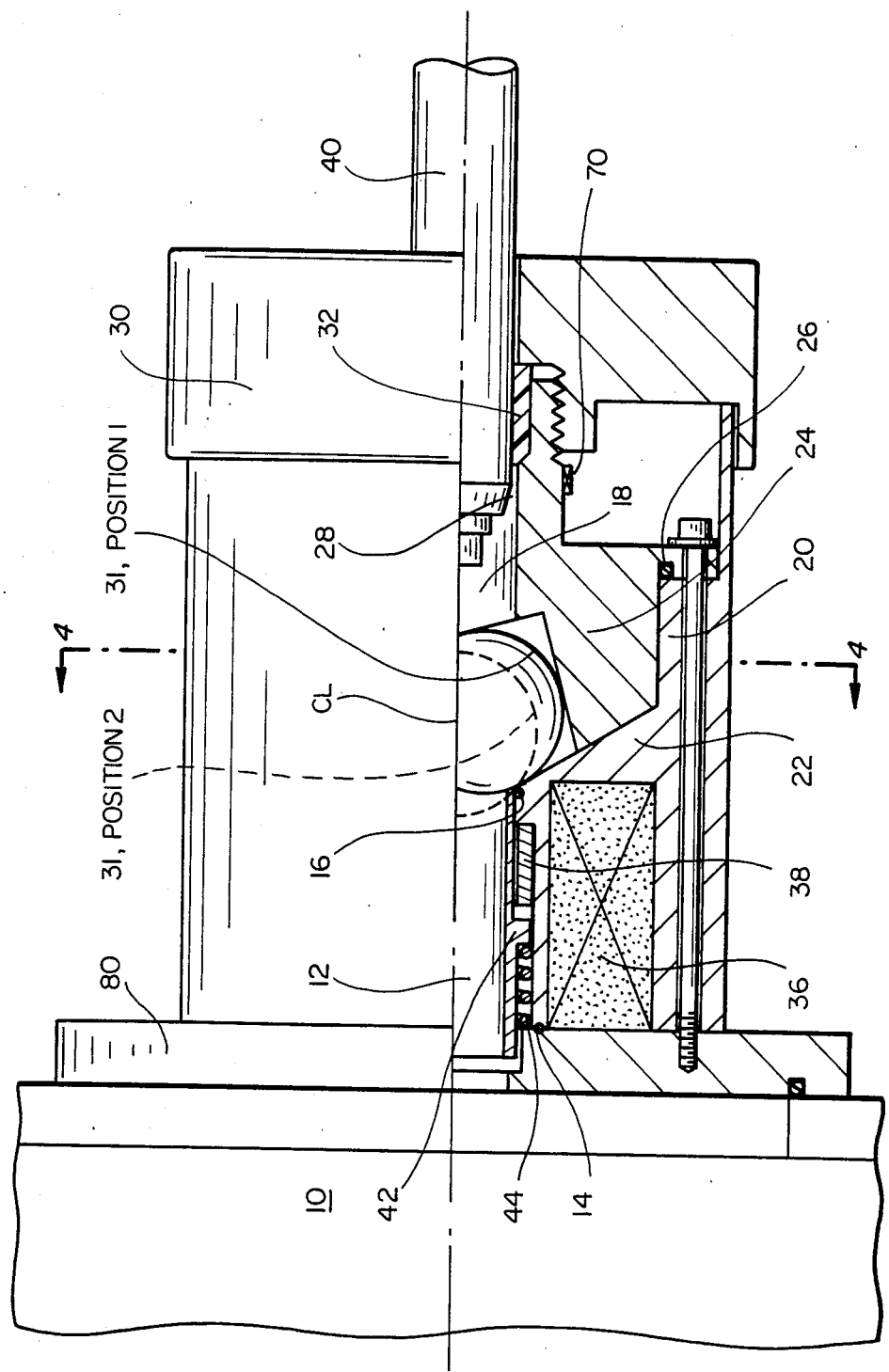
FIG_1

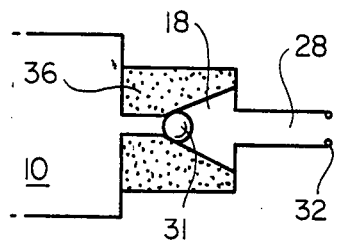
FIG_2A
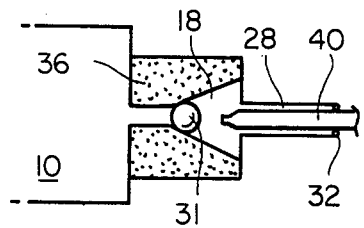
FIG_2B
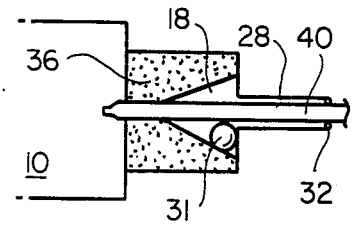
FIG_2C
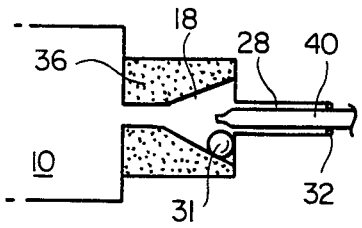
FIG_2D
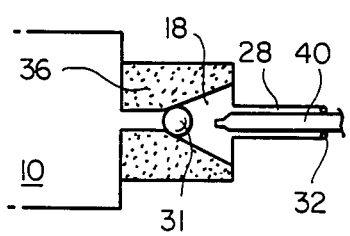
FIG_2E
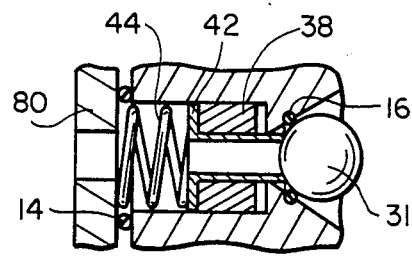
FIG_6

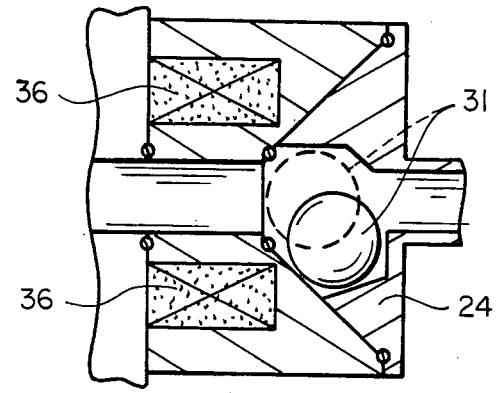
FIG_3
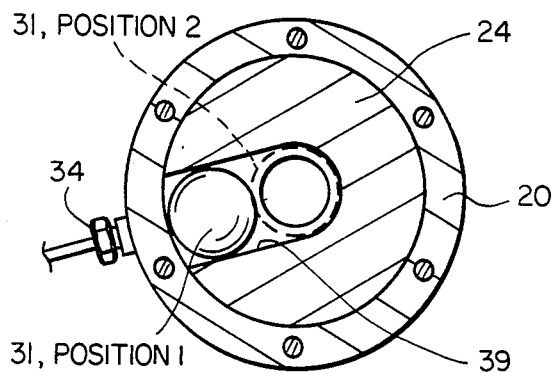
FIG_4
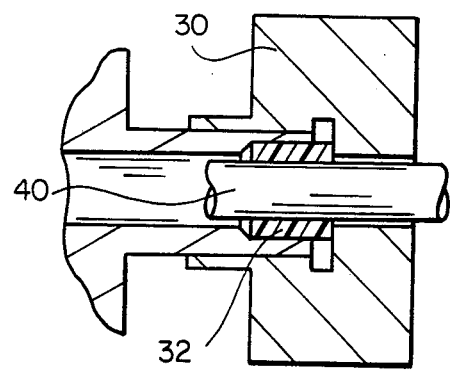
FIG_5

INLET VALVE FOR PROBE APPARATUS

TECHNICAL FIELD

This invention relates to a probe apparatus and in particular to an inlet valve used to control access of a probe to a sealed environment, such as a vacuum chamber.

BACKGROUND ART

A major problem found with prior art probe inlet apparatus is the low atmosphere leakage that is experienced between the vacuum chamber and the adjacent environment, when the solid probe body is moved into and out of the vacuum chamber. Generally, probe insertion and withdrawal is performed manually, and therefore control and uniformity of the speed of the movements vary from operator to operator. Thus, the leakage problem becomes significant if the opening and sealing of the entry to the chamber does not occur in a synchronous manner with the probe movement. In such event, the vacuum is not maintained at a desired level and further probe analysis may be erroneous.

SUMMARY OF THE INVENTION

An object of this invention is to provide a valve apparatus wherein air leakage between a sealed chamber and the external environment is minimized.

Another object of this invention is to provide a simple and effective means for opening and sealing the entry to a sealed chamber during a probe entry and withdrawal.

Another object of this invention is to provide an inlet valve apparatus having reduced power requirements, and which operates at reduced cost and with increased reliability.

In accordance with this invention, the entry to a vacuum chamber is controlled by means of a ball, which is made of a magnetic material, preferably steel. At the beginning of the procedure, the ball is moved along a shallow ramp by means of an electromagnet to seal the entry of an access inlet to the vacuum chamber. The vacuum chamber is evacuated, and the electromagnet is inactivated. The ball remains seated in a sealing or closed position, by virtue of the differential pressure between the vacuum chamber and a forechamber in which the ball is located. The probe partially enters a probe inlet and the forechamber is evacuated, thus decreasing the differential pressure and allowing the ball to drop by gravity, thereby opening the access inlet to provide an open channel for the probe to the vacuum chamber.

During the withdrawal phase, the current to the electromagnet is applied and the probe is partially withdrawn from the forechamber to allow the steel ball to move up the shallow ramp and seal the access inlet. After the probe has been further withdrawn, the pressure in the forechamber is increased to atmospheric, so that the ball remains in the closed position, effectively sealing entry to the vacuum chamber. At this time the current to the electromagnet may be removed and the ball stays seated in the closed position by means of the differential presure.

BRIEF DESCRIPTION OF THE DRAWINGS

The invention will be described in detail with reference to the drawings in which:

FIG. 1 is a schematic sectional view, partly opened, of a probe apparatus incorporating the novel features of this invention;

FIGS. 2A-E are representational sectional views that depict the sequence of operation of the ball valve;

FIG. 3 is a sectional side view of a portion of the apparatus of FIG. 1 showing the ball valve in each of its positions;

FIG. 4 is an end view illustrating the two positions of the ball valve during operation of the apparatus of FIG. 1;

FIG. 5 is a sectional side view of a seal assembly that is used with the probe apparatus of this invention; and FIG. 6 is a partial sectional view, illustrating a spring-loaded mechanism for enabling release of the ball valve to an open position.

Similar numerals refer to similar elements throughout the drawings.

The dimensional scale of the elements in the different figures may vary for the purpose of convenience and simplicity.

DESCRIPTION OF THE PREFERRED EMBODIMENT

With reference to the drawings, an assembly for analyzing materials by means of a probe 40 includes a sealed chamber 10 that is evacuated to a desired pressure, preferably a high vacuum down to 10-9 Torr. A cylindrical access inlet 12 allows access to the chamber 10 through an aperture in a flange 80 which is sealed by O-ring seal 14 at one end and by an O-ring 16 at the other end of the access inlet.

A frustoconical forechamber 18 of relatively small volume leads to the access inlet at the end which supports O-ring 16. The forechamber has a relatively short cylindrical section 20 joined to a conical portion 22 to which an annular configured aluminum part 24 is attached. The annular part 24 is formed with a radial slot that acts as a guide for the ball 31. The radial slot is oriented at a shallow angle to the horizontal axis and centerline CL. Consequently, the vertical height that the ball 31 must move from the open position 1 up to the closed aperture position 2 is relatively small. Therefore, the power requirement of the coil 36 is reduced, allowing the use of a less complex coil of smaller size. In this way, a saving in cost and increased reliability are realized. The part 24 is designed so that it effectively reduces the volume of the forechamber 18 which needs to be evacuated, affording rapid evacuation of the forechamber to a desired pressure and thus a faster cycle time for valve action. Operating time of the electrical core 36 is reduced and as a result the heating effect of the power dissipated by the core is lowered. The part 24 bears against a relatively large Viton-type O-ring 26 and the end of the cylindrical section 20. The aluminum part 24 also encircles a probe entry inlet 28, which has a seal 32 made of glass filled PTFE for example, (FIGS. 2 and 5). This prevents leakage of external ambient air into the system.

The seal 32 is formed as a tubular sleeve that slides freely over the probe shaft 40 which is to be sealed. The sleeve is retained in the valve body by a clamp nut 30. During operation, the probe shaft 40 is inserted through the sleeve 32 into the forechamber 18. The clamp nut 30 is rotated to provide an axial load on the sleeve thereby forcing it against the angled face of the valve body. The sleeve 32 is elastically deformed by axial compression and radially compressed against the probe shaft 40 so as to provide a seal against the probe shaft and the valve body that enables the fore chamber to be evacuated to a desired pressure. Upon opening the ball valve as implemented in this invention, the low coefficient of friction of the seal material allows the probe 40 to be inserted to its full length into the high vacuum system 10. An evacuation system 34 is provided for pumpout of the forechamber to a desired pressure level during probe entry into the entry inlet 28. When removing the probe shaft, the axial load on the seal 32 is removed by rotating the clamp nut 30 in the reverse direction, and the seal returns to its original state.

In accordance with this invention, an electromagnet assembly comprising an electrical coil 36 and soft magnetic iron ring 38 is provided adjacent to the access inlet 12 and forechamber 18. When current is provided to the coil 36, the magnetic field generated by the electromagnet causes a magnetic steel ball 31 to move up a short ramp 39 to the center of the generated magnetic field which is generally at the centerline (CL), and thus to the entry aperture of the access inlet within the area of the O-ring 16. Ball 31 has a diameter larger than that of the opening so that it can effectively seal the entry aperture and prevent leakage between the vacuum system and the ambient air from which the solid probe is inserted into the valve body.

At this time, the forechamber is at atmospheric pressure. The main manifold has been pumped so that the vacuum chamber 10 is evacuated to a vacuum as low as $10^{-9}$ torr. The difference in pressure between the forechamber and the vacuum chamber serves to retain the ball 31 in the seated closed position at the opening to the access inlet, as shown in FIGS. 2A and 2B. To eliminate the possibility of magnetic interference and to save power and reduce heating, the electromagnet is turned off, and the ball 31 remains firmly seated in the aperture between the forechamber and access inlet 12, thereby effectuating a seal between the forechamber and the vacuum chamber 10.

With the ball 31 securely positioned to serve as a seal, a solid cylindrical probe 40 is inserted into the entry inlet 28. By tightening the clamp nut 30, the seal 32 is pressed against the probe 40 thus providing an airtight seal. Once the probe 40 has partially entered the probe inlet 28 as in FIG. 2B, the forechamber is pumped out to a pressure of about $10^{-2}$ to $10^{-3}$ Torr by the evacuation system 34.

In order to maintain the high vacuum of the vacuum chamber, the current to the electromagnetic coil is applied prior to evacuation of the forechamber. Thus, the ball stays in the sealed or closed position and prevents leakage between the forechamber and vacuum chamber. The pump-out valve of the evacuation system 34 is then shut, and the electromagnet is inactivated. As the pressure differential is not sufficient to hold the ball 31 against the aperture in the closed position, the ball 31 separates from the aperture and rolls down the short ramp by gravity force. When the ball is not in the closed position, an open line-of-sight central channel is provided to allow access of the probe from the forechamber through the access inlet 12 to the vacuum chamber 10 (see FIG. 2C).

To ensure that the ball 31 does not stick in a closed position when the probe is being inserted, a collar 42 that is spring loaded by a spring 44 presses against the ball 31, as illustrated in FIG. 6. When the magnetic field of the electromagnet is not present and the differential pressure between the forechamber and the vacuum chamber is not sufficient to hold the ball in place, the spring load force of the spring loaded collar overcomes any tendency of the ball to remain seated in the closed position.

When the ball is seated in the closed position, it is not desirable to have the spring load force acting against the ball prior to evacuation of the forechamber. In such case, current is applied to the electromagnet coil, which causes a voice coil type action on an iron ring that serves to retract the load spring 44, so that there is no force being applied against the ball. However, when the current is removed, and when the forechamber has been evacuated, the compressed retracted spring will act on an ejector element that will force the ball to be ejected from the aperture in which it is seated during the closed position.

After the probe analysis has been completed, the electromagnet current is applied while the probe is still in the vacuum chamber. Since part of the probe is within the forechamber as well, the ball cannot move to the closed position because the probe blocks the ball from reaching the aperture at the access inlet. As the probe is withdrawn from the vacuum chamber, and when the probe reaches a point past the aperture but before exiting the access inlet, the ball will be able to move, in response to the generated magnetic field, to the closed position. The forechamber is still at a high vacuum so that only the action of the electromagnet is holding the ball in place (FIGS. 2D and 2E).

The probe is further withdrawn and when it passes the O-ring seal 32 of the probe inlet, the forechamber is brought to atmospheric pressure so that the ball stays in the closed position by virtue of the differential pressure. At this point the electromagnet current is removed, and the ball remains in the closed position.

In those cases where the probe shaft is made of a delicate material, and would be subject to damage by the ball if the ball were to be moved while the probe shaft is still in the forechamber area, the withdrawal of the probe shaft is sensed by a probe sensor which senses when the probe shaft has passed from the forechamber. At such time, electronic circuitry is activated by the probe sensor to activate the current of the electromagnet so that the ball will now move to the closed position once the probe shaft is out of the forechamber. The probe position indicator or sensor may be an infrared sensor, by way of example.

It should be understood that control of the sequence of steps of probe entry and withdrawal, may be achieved by interlock and control circuitry, as may be implemented within the knowledge of those skilled in the art. Also, the evacuation of the forechamber and vacuum chamber may be controlled by a programmed circuit. The parameters and materials delineated in the description may be modified or changed within the scope of this invention.

The novel design disclosed herein provides a complete line-of-sight valve to accommodate a solid probe. If desired, a laser beam or other radiation can be directed through the open central channel when the ball valve is in the open mode. By using the radial slot in conjunction with the configured annular part, there is a reduction of dead volume of air whereby the amount of air that could reach the vacuum is minimized and contamination in the vacuum system is virtually eliminated.

What is claimed is:

1. An inlet valve for introducing a sample insertion device or probe into a vacuum chamber comprising:

an access inlet disposed at the entry to said vacuum chamber;

an entry inlet for accepting said sample insertion device or probe;

a forechamber located between said inlets;

means at said entry inlet for sealing to the sample insertion device or probe when it is inserted into the forechamber;

pumpout means for evacuating said forechamber;

said inlets and forechamber forming a channel to said vacuum chamber;

a spherical magnetic body disposed in said forechamber;

an electromagnet means adapted to be activated for actuating said magnetic body to move to a first position at which said body is securely retained at said access inlet to seal the forechamber from said vacuum chamber so that when a device is inserted in said entry inlet, leakage of air from the forechamber into said vacuum chamber is prevented, and when said electromagnet means is inactivated, said body is allowed to move to a second position so that the access inlet is open for insertion of said insertion device or probe into said vacuum chamber.

2. A valve apparatus as in claim 1, wherein said forechamber includes an annular configured part having a radial slot disposed at a shallow angle relative to a horizontal plane for guiding said spherical body between said two positions.

3. A valve apparatus as in claim 1, wherein said access inlet and entry inlet have substantially the same predetermined diameter, and the magnetic body has a diameter larger then said predetermined diameter so that when said device is fixed in said first position, said access inlet is sealed from ambient air.

4. A valve apparatus as in claim 1, wherein said forechamber has a frustoconical portion adjacent to said access inlet, and the smallest diameter of said portion is substantially the same as that of the access inlet.

5. A valve apparatus as in claim 1, wherein said magnetic body is a steel ball.

6. A valve apparatus as in claim 1, including a spring loaded ejection element disposed at the end of said access inlet for applying a force against said magnetic body.

7. A valve apparatus as in claim 1, including a seal assembly located at said entry inlet, said seal assembly comprising a tubular sleeve, and a clamp nut for retaining said sleeve.

8. A valve apparatus as in claim 7, wherein the inner diameter of said sleeve is substantially close to the outer diameter of said device or probe so that when said clamp nut is rotated, said sleeve is axially compressed against said device or probe to form an effective seal.

9. A method for probe analysis wherein an apparatus includes a vacuum chamber, a forechamber, an access inlet between said chambers, and an entry inlet preceding the forechamber, said chambers and inlets forming a channel, including a magnetic body comprising the steps of:

evacuating said vacuum chamber so that a pressure differential is developed between said vacuum chamber and said forechamber;

actuating an electromagnet means to move said magnetic body to a first position to seal the access inlet and thereby close the channel between said chambers;

inserting a sampling device or probe device into said entry inlet;

evacuating said forechamber to reduce said pressure differential so that the magnetic body moves to a second position away from said access inlet by gravity force, thereby opening the channel between said chambers; and fully inserting said device through said forechamber and access inlet and into said vacuum chamber for conducting a desired analysis.

* * * * *